May 5, 1942.     M. MAUL     2,282,072
MACHINE FOR OPERATING UPON RECORD CARDS
Filed May 3, 1940     9 Sheets-Sheet 1

INVENTOR.
Michael Maul
BY
ATTORNEYS.

May 5, 1942. M. MAUL 2,282,072
MACHINE FOR OPERATING UPON RECORD CARDS
Filed May 3, 1940 9 Sheets-Sheet 2

INVENTOR.
Michael Maul
BY
ATTORNEYS.

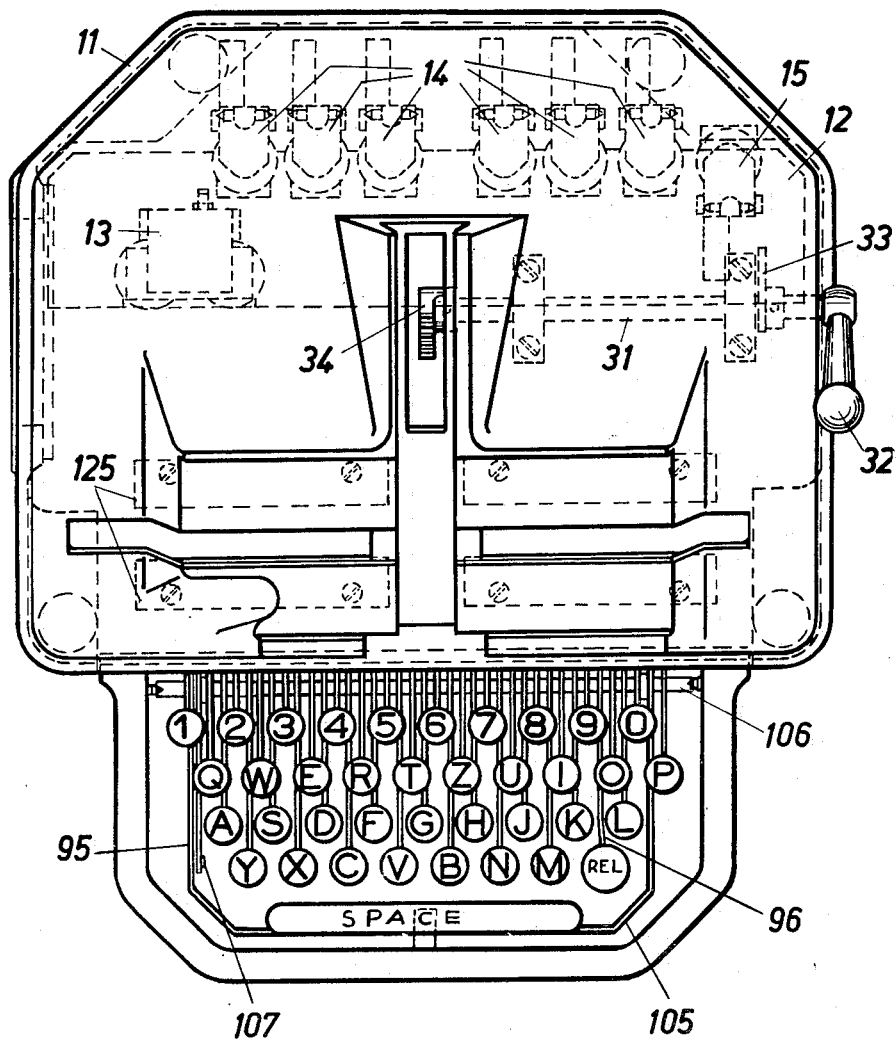

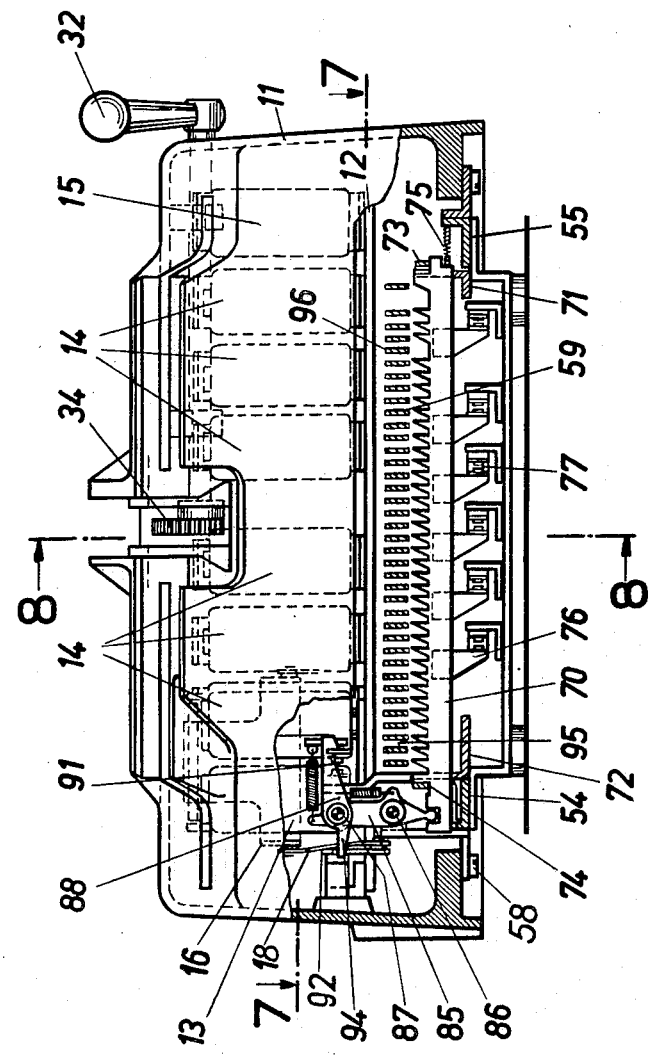

May 5, 1942.　　　　　M. MAUL　　　　　2,282,072
MACHINE FOR OPERATING UPON RECORD CARDS
Filed May 3, 1940　　　　　9 Sheets-Sheet 5
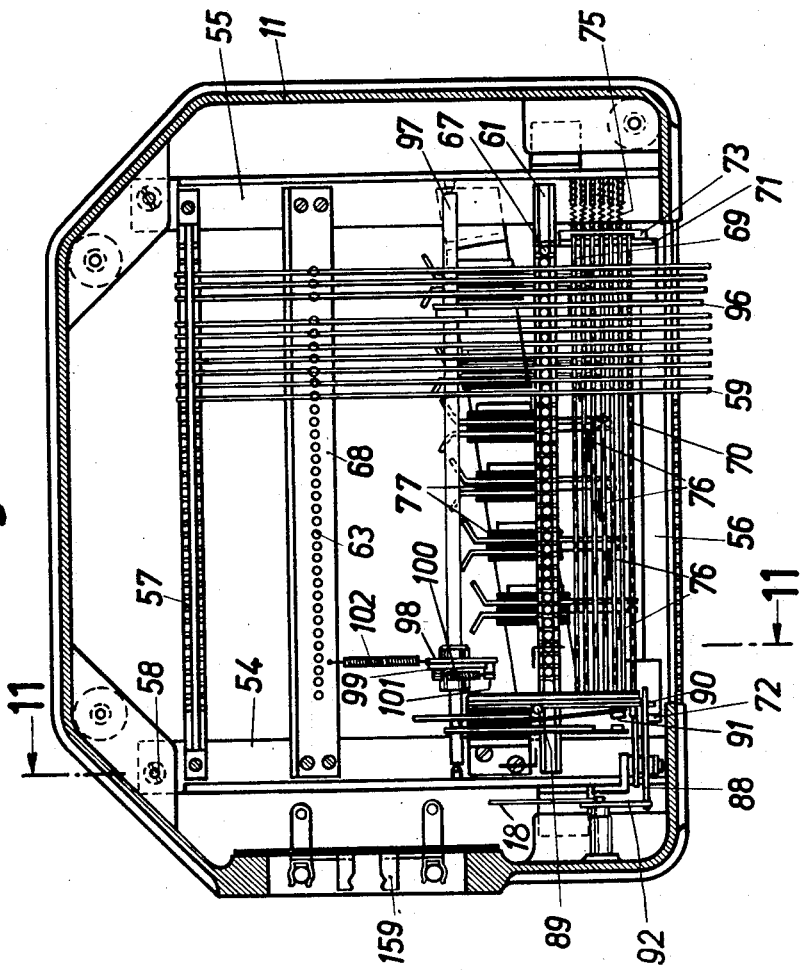
INVENTOR.
Michael Maul
BY
ATTORNEYS.

May 5, 1942.　　　　M. MAUL　　　　2,282,072
MACHINE FOR OPERATING UPON RECORD CARDS
Filed May 3, 1940　　　9 Sheets-Sheet 6
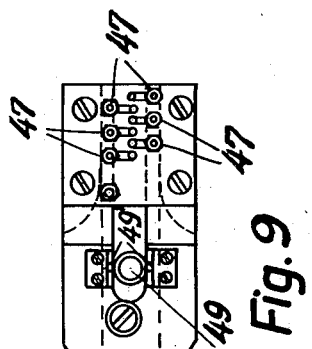
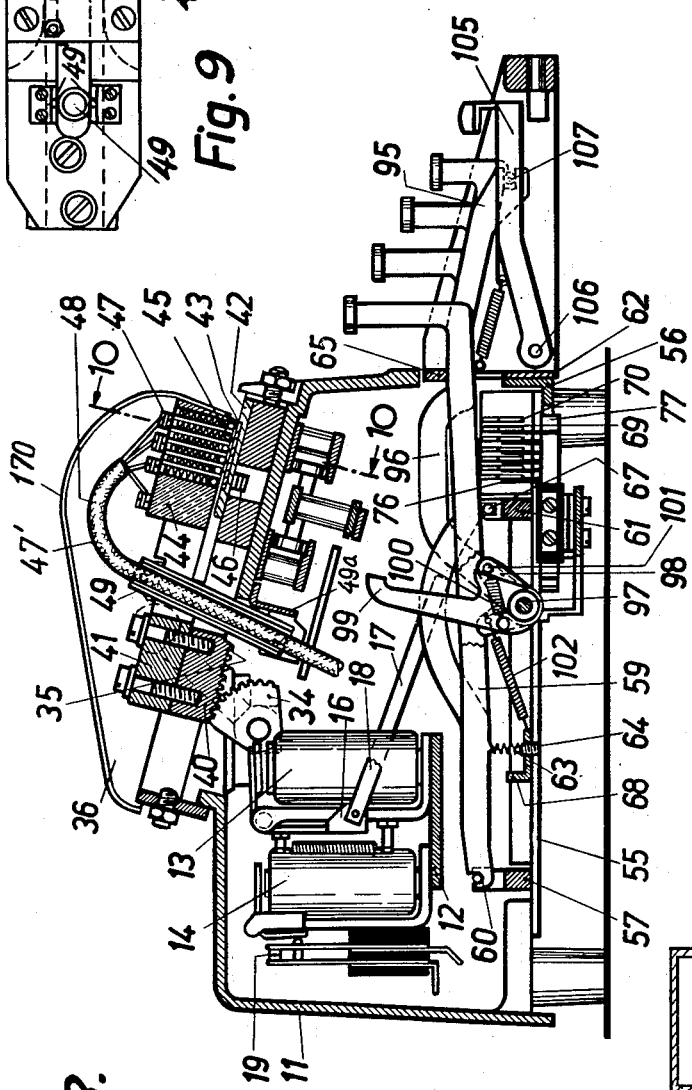
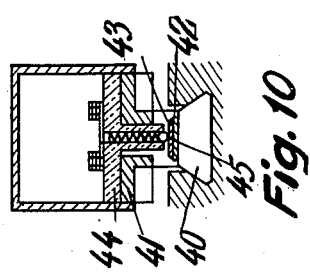
INVENTOR.
Michael Maul
BY
W. M. Wilson
ATTORNEYS.

May 5, 1942.　　　　　M. MAUL　　　　　2,282,072
MACHINE FOR OPERATING UPON RECORD CARDS
Filed May 3, 1940　　　　9 Sheets-Sheet 7
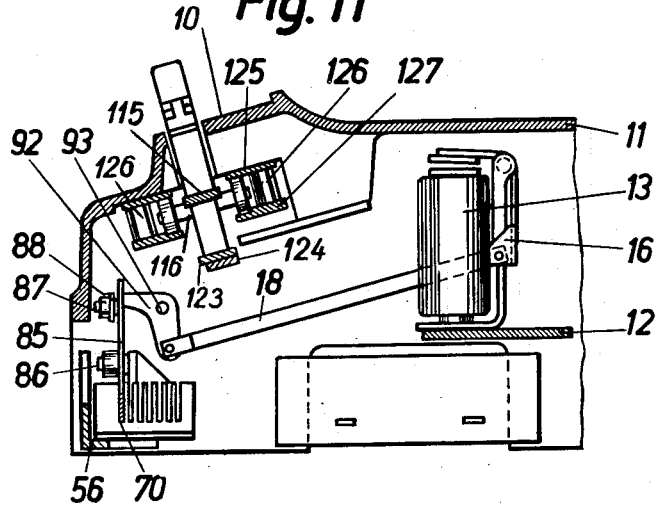
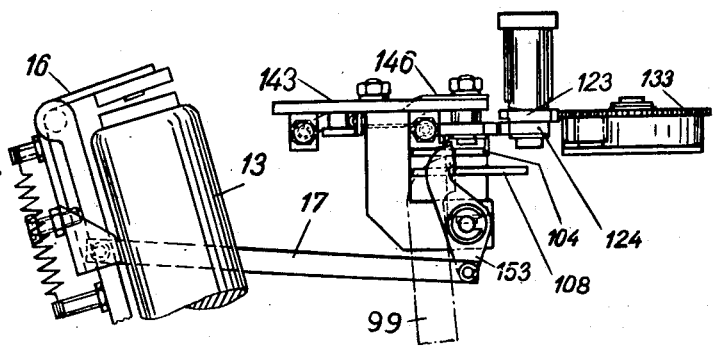
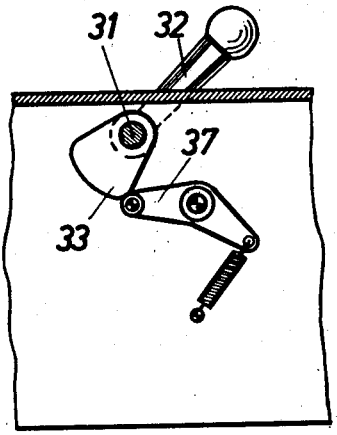
INVENTOR.
Michael Maul
BY
ATTORNEYS.

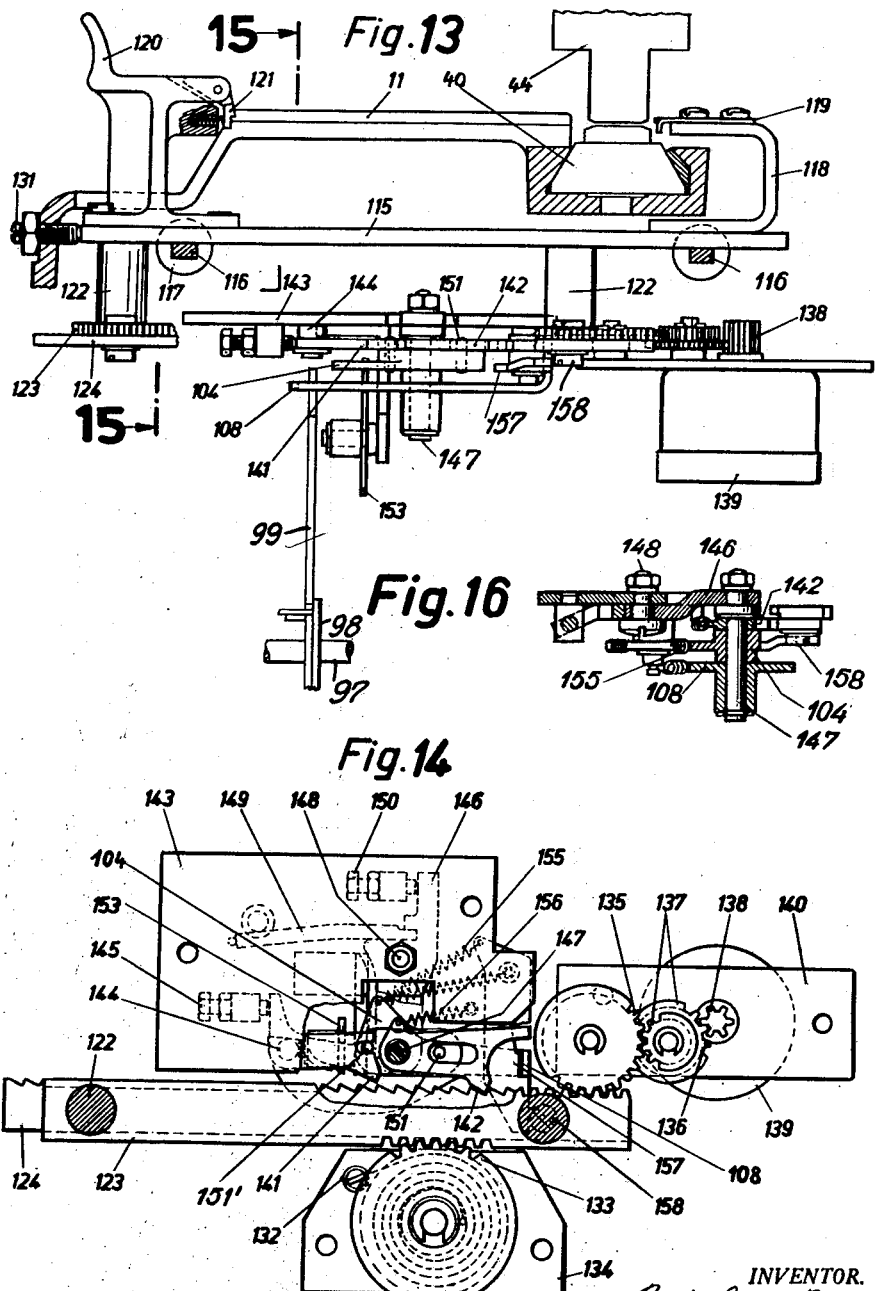

Patented May 5, 1942

2,282,072

UNITED STATES PATENT OFFICE 2,282,072

MACHINE FOR OPERATING UPON RECORD CARDS

Michael Maul, Berlin-Johannisthal, Germany, assignor to the firm Deutsche Hollerith Maschinen Gesellschaft m. b. H., Berlin-Lichterfelde, Germany Application May 3, 1940, Serial No. 333,160
In Germany May 6, 1939

4 Claims. (Cl. 73—51)

This case relates to means for verifying record cards to check the accuracy with which data has been represented in codal form on the cards.

The invention is particularly concerned with the verifying of plural deck cards or cards having tandem record decks, each adapted to serve independently of any other deck as a data recording medium. The record deck has parallel columns of index positions which may be perforated according to a selected code to represent characters, each column being adapted to represent one character. At the foot of each column, the conventional form of the character intended to be represented codally in the column may be written to guide the operator of the punching machine disclosed in my copending application, Serial No. 270,324, filed April 27, 1939, and now patent No. 2,210,552, in selecting the character keys of the punching means to cause punching of the codal form of the character. In my Patent No. 2,031,569, a machine for verifying plural deck cards is disclosed. The latter machine uses two designation sensing units, one for each of two decks of a dual deck card, and a single set of character keys which may be coordinated with either sensing unit to verify one deck at a time. One difficulty with this former machine is that it conceals from the operator's view the conventionally written or printed character on the card corresponding to the codal designation being verified, making it necessary to resort to a source of the data external to the card as a guide to the operator in operating the character keys.

It may be stated, now, that one object of the present invention is to overcome the aforementioned difficulty by providing verifying means constructed and arranged to expose to the operator's view the conventional, written character at the end of a column of any of the decks being verified. Thus, the conventional characters on the plural deck card itself constitute the source of data guiding the operator in selecting the character keys to perform the verifying operation for each record deck.

The invention proposes to attain the above object by means preferably including only a single designation sensing unit which is capable of being shifted to different deck positions, in each of which the unit is adapted to sense the designations of a different one of the record decks of the plural deck card.

Further, the invention proposes to provide for all the decks of the card only a single sensing unit which is of an electrical nature and electrically connected to stationary electrical devices in a manner enabling the sensing unit to be shifted from one deck position to another without injuring the electrical connections to the stationary devices and without causing the electrical connections to hinder the shifting of the unit to different deck positions.

According to the preferred form of my invention, the columns of a record deck are sensed by the reading unit in succession, and to enable this to be done, the card is fed transversely to the direction in which a column extends and such feed may be referred to as the transverse card feed. In connection with this feature, the invention provides indexing means to indicate which column is at verifying position or in a position to be sensed by the reading unit. Broadly, the transverse card feed may be considered as placing successive fields or sections in verifying position, and such fields or sections may include one or more columns.

Other objects of the invention will be pointed out in the following description and claims and illustrated in the accompanying drawings, which disclose, by way of example, the principle of the invention and the best mode, which has been contemplated, of applying that principle.

In the drawings:

Fig. 5 is a top view of the machine, with the card reading or sensing means and the card carriage removed.

Fig. 6 is a front view, also omitting the card reading means and the card carriage, and with the keys in section.

Fig. 7 is a section along line 7—7 of Fig. 6, with some of the key levers omitted for the sake of clearness.

Fig. 8 is a section along lines 8—8 of Fig. 6, with the card reading means and the card carriage included.

Fig. 9 is a plan view of the card reading means.

Fig. 10 is a section along line 10—10 of Fig. 8.

Fig. 11 is a section along line 11—11 of Fig. 7.

Fig. 12 is a detail, side view of the manual shifting means for the card reading means.

Fig. 13 is a detail, front, sectional view showing the guide means for the carrier of the reading means and also showing the escapement means for the card carriage.

Fig. 14 is a plan view of the card carriage rack and associated escapement and feed means.

Fig. 15 is a section along line 15—15 of Fig. 13, including the card feed control magnet.

Fig. 16 is a section through the escapement pawls and their support.

Figure 2:
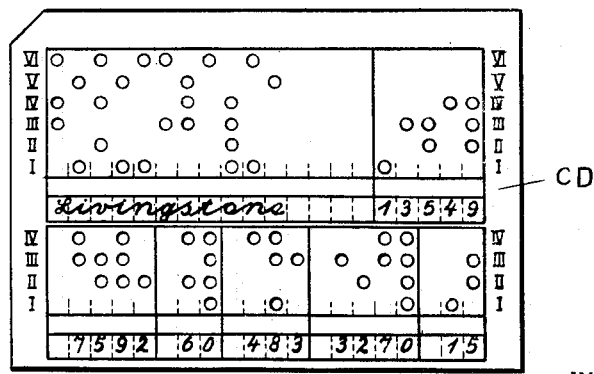
Fig. 2 shows a plural deck record card to be verified.

In Fig. 2 is shown an illustrative form of a plural or tandem deck card, CD, which may be verified by the present machine. The card is divided into upper and lower record decks, each deck having parallel columns, with each column adapted to be punched with one character representation. The upper deck columns have six index positions which, as may be understood from Fig. 3, may be variously perforated to represent numerals and letters. The lower deck has but four index positions in each column, adapted to represent only numerals. A line of conventional writing at the foot of each record deck indicates in uncoded form the characters which the record deck is required to represent in codal form. Each written character and the codal punching to be checked therewith for equivalency are in the same card column.

The card to be verified is placed on a card bed 10 comprising a flat, depressed portion of the housing 11 (Figs. 1, 5, 6, and 8). In the interior of the housing is a double coil card feed magnet 13 supported on a frame plate 12 on which are also supported six comparing relay magnets 14 and a relay magnet 15, the purpose of which will be explained later. The armature lever 16 of the feed magnet 13 is connected at opposite sides to links 17 and 18, respectively associated with the card feed mechanism and with means to open a common control switch 91, in a manner which will be described later. Each of the comparing relay magnets 14 has associated therewith a pair of armature contacts 19 (Fig. 8) and is constructed with two windings (see the circuit diagram, Fig. 17) so wired that the net magnetic force of the magnet is zero when currents of the same intensity flow through the two windings. The relay coil 15 has a single winding which when energized closes armature contacts 20 (Fig. 17) for a purpose which will be explained later.

Figure 1:
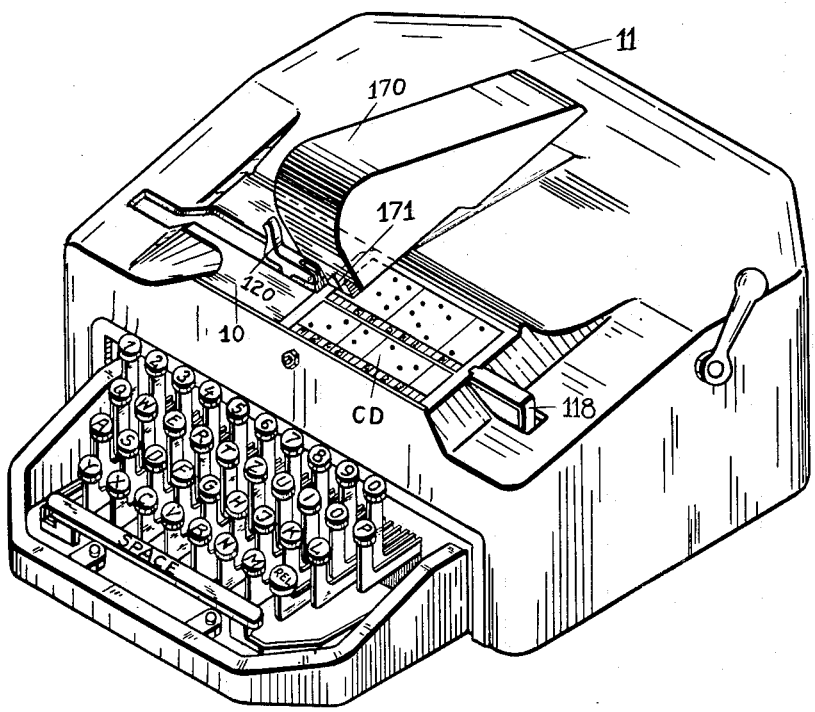
Fig. 1 is a perspective view of the machine embodying my invention.

Slidably mounted on housing 11 for movement in the direction in which a card column extends when the card lies on the card bed is a card reading unit 36 comprising a lower slide bar 40, the bottom of which is formed with rack teeth 35 (Fig. 8) meshed with a gear sector 34 fast to a shaft 31 which extends outside the housing 11 and there carries a crank handle 32 (see Figs. 1, 5, 6, and 12). By rocking the handle 32, the card reading unit is shifted from one deck position to read the perforations of one deck to an alternative deck position for reading the perforations of the other deck. The reading unit is retained releasably in either of its alternative positions by coaction of a spring-pressed impositive lock 37 with a sector 33 fixed to shaft 31. Fig. 1 shows the reading unit in rear position for reading the upper record deck, while Fig. 8 indicates the forward position of the reading unit for acting on the lower record deck.

The reading unit 36, in addition to slide bar 40, comprises an upper bar 41 secured at the rear to the top of bar 40 and unsupported at its front end. The bar 41 is thus supported cantilever-fashion, with its forward portion extending above the card on the card bed. In the rear deck position, the front end of the bar 41 and the parts carried thereby terminate short of and leave exposed the written characters at the foot of the upper record deck, and in the forward position of the reading unit, the bar 41 and its parts terminate short of and expose the written characters at the foot of the lower record deck. Thus, the operator may freely see the written character at the foot of a column of either deck being verified and the codal equivalent of which is to be verified.

The lower, slide bar 40 extends into a transverse slot intersecting the card bed (see Fig. 5) and which exposes the card portion, including the column to be verified, to the action of the perforation sensing means carried by the card reading unit. The forward portion of slide bar 40 carries an insulation plate 42 on top of which is fixed a common contact plate 43 (see also Fig. 10) directly underneath the card portion which is at the transverse slot in the card bed. The upper bar 41 carries an insulation block 44 formed with conductively lined through-apertures containing contact balls 45 which are spring-pressed downwardly to engage the contact plate 43 except when insulated therefrom by an unperforated portion of the card on the card bed. The contact balls are arranged in a column adapted to aline with a deck column. There are six contact balls, one for each of the index positions (see Figs. 2 and 3) of the upper deck. When the reading unit is in lower deck reading position, the two rear contact balls are idle and are insulated from the contact plate 43 by the unperforated portion of the card extending between the uppermost index position of the lower deck and the lowest index position of the upper deck. The contact plate is connected to a terminal 46 and the conductive linings of the apertures containing the contact balls are individually engaged with terminals 47 (see Figs. 8, 9, and 10) from which wires are brought into a cable 47'. The cable passes through a tube 49 swiveled, near its upper end, by pins 49' to the upper bar 41. The housing carries a guide bracket 49a shaped to enclose partially the lower end of the tube 49. Due to the swiveled connection of the tube to the reading unit and due to the tube passing through the bracket 49a, the tube and cable readily follow the shifting movements of the reading unit to alternative deck positions. The wires are brought from the lower end of the cable into individual connection with one winding of each of the stationary comparing magnets 14. The mounting of the cable 47' and tube 49 enables the reading unit to be shifted without causing haphazard and undue play of the wires, thereby preventing rubbing of the insulation against metal frame parts and possible breaking of the insulation and exposure of the wires to the frame. Furthermore, the electrical connections between the reading unit and the stationary magnets are supported and arranged in a manner which avoids interference with the shifting of the reading unit freely from one deck position to another.

To select the characters to be verified, the operator depresses the character keys 59 of the keyboard. The keyboard is mounted on a subframe comprising angle bars 54, 55, and 56 and a rear bar 57 (see Figs. 7 and 8). Four screws 58, one at each corner, secure the subframe to base flanges of the housing 11. The key levers 59 are pivotally mounted at their rear ends by a shaft 60 fastened to the ends of the rear bar 57 which is formed with guide slots for the rear portions of the key levers. The intermediate portions of the key levers are guided by a slotted bar 61 and the forward portions of the key levers are guided by a comb plate 62. Springs 63 between the pin screws 64 threaded into an angle bar 68 and the key levers urge the key levers upwardly, maintaining their rear ends engaged with pivot shaft 60 and their forward portions against a stop bar 65 (Fig. 8). The bar 61 is grooved lengthwise to seat balls 67 between adjacent key levers so as to prevent, in a known manner, more than one key lever at a time being depressed.

Figures 3, 4:
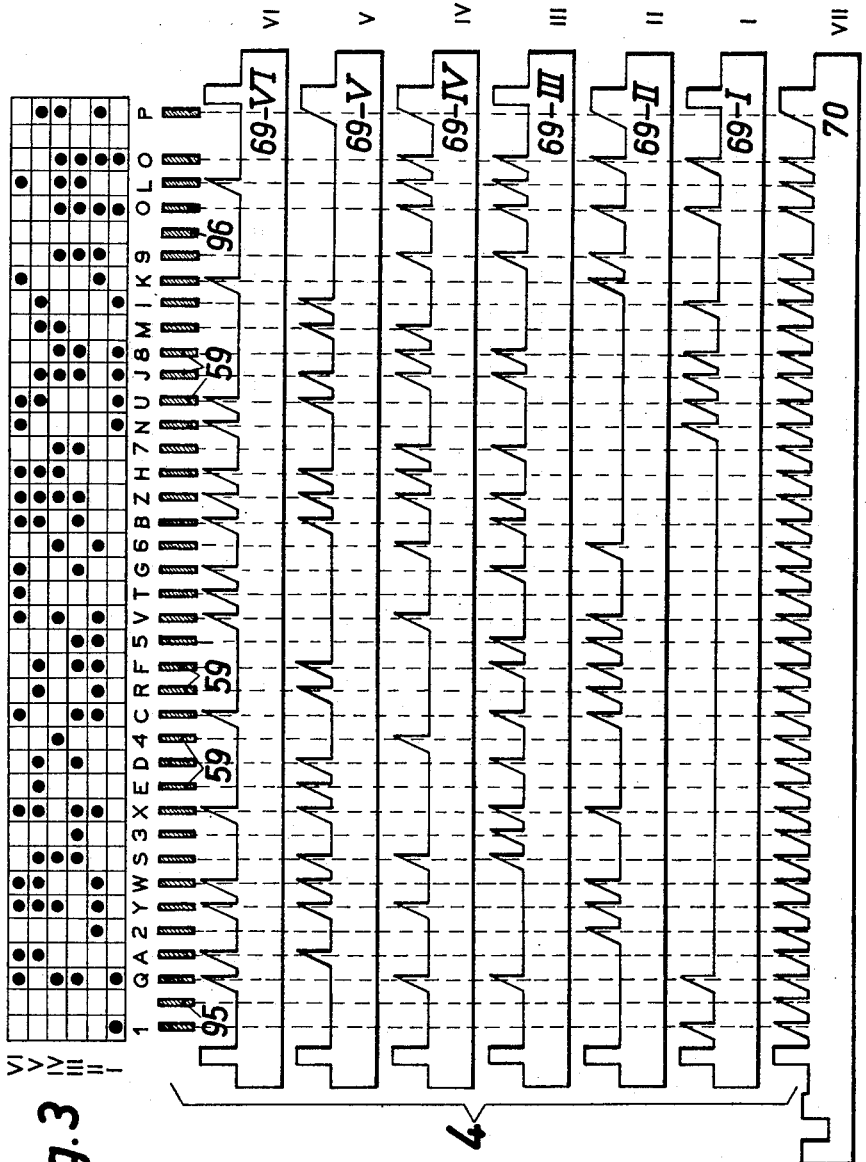
Fig. 3 shows the code for representing letters and numerals as perforation patterns.
Fig. 4 shows the character-selecting key levers in relation to the associated selector bars controlled thereby.

Referring to Figs. 6, 7, and 8, six selector slides 69, one for each of the six possible index positions of a column, and a common slide 70 are mounted for sliding movement lengthwise by slotted end pieces 71 and 72 to which are fixed plates 73 and 74 for holding the slides down within the slots of the end pieces. The bar 74, as indicated in Fig. 6 also acts as a stop for limiting movement of the slides to the left under the influence of pressure springs 75. Each selector slide 69 has an insulating, dependent lug 76 adapted to close a pair of selector contacts 77 upon movement of the slide to the right. The movement of a slide to the right is effected when a key lever is depressed and cams against the underlying inclined side of a tooth of the slide. The relation of the teeth of the slides to the key levers is indicated in Fig. 4 from which it may be understood that depression of a key lever actuates one or more of the slides to the right according to the code shown in Fig. 3. Thus, one or more of the selector contacts 77 are closed in a combination selected by and corresponding to the depressed character key.

The common slide 70 has an inclined tooth below each key lever and is moved to the right whenever any of the character keys are depressed. The left end of the slide 70 has a swivel connection to the lower end of a lever 85 pivoted on a stud 86 (also see Fig. 11). The upper arm of lever 85 has a pivot pin 87 for mounting a hook lever 88, the right end of which is hooked over the forward end of a plate lever 90 pivoted on a vertical pin 89 for horizontal rocking movement. As indicated in Figs. 6 and 7, the lever 90 is adjacent one of the spring leaf blades of a normally open switch 91. Upon depression of any of the key levers 59, common slide 70 is shifted to the right, rocking lever 85 counterclockwise (Fig. 6), thereby bodily displacing hook lever 88 to the left so as to force lever 90 to close common switch 91. The closure of switch 91, when the verifying operation indicates a character to be correctly designated in a column, energizes card feed magnet 13, through a circuit which will be traced later. When magnet 13 is energized, its armature 16 rocks counterclockwise (Fig. 11) which, through link 18, rocks a bell crank lever 92, pivoted on a pin 93, also counterclockwise. The horizontal arm of lever 92 overlies the rear arm 94 (Fig. 6) of hook lever 88 and when lever 92 rocks counterclockwise, its horizontal arm moves down and engages the arm 94 to rock hook lever 88 counterclockwise, thereby releasing it from the plate lever 90. Common contacts 91 thereupon spring open regardless of maintained depression of the active key lever. When feed magnet 13 is deenergized, hook lever 88 is permitted to rock clockwise, and when the key lever is released, the hook lever returns to the right (Fig. 6) and relatches the plate lever 88.

The keyboard includes a space bar straddling bail arms 105 (Figs. 5 and 8) which are fastened to a shaft 106. The left hand bail arm has a pin 107 passing through a slot in a lever 95 (see also Fig. 6) which is mounted similarly to the key levers 59 but arranged to actuate only the common slide 70. Thus, depression of the space bar will cause closure of common switch 91 to energize the card feed magnet 13 to effect a column space feed of the card, in a manner which will be explained later.

The keyboard also has a release key and lever 96 fast to a shaft 97 (Figs. 7 and 8). The intermediate portion of the lever is offset upwardly to avoid engagement with and actuation of any of the selector slides 69 or the comomn slide 70 when the release key is depressed. Fastened to shaft 97 is a lever 98 and, adjacent thereto, a lever 99 is freely mounted on the shaft. A spring 100 extending between lever 99 and a pin 101 of lever 98 holds the side of lever 99 against the pin and urges the latter to follow the clockwise rocking of lever 98. At the same time, the spring 100 may stretch to permit the lever 99 to remain stationary after a limited follow-up movement thereof while 98 continues to its clockwise limit. A spring 102 connecting lever 98 to the angle bar 68 holds the release key means in normal position. When the release key is depressed, lever 99 follows yieldingly and its upper bent end engages and yieldingly rocks a lever 108 of the card feed escapement mechanism to cause release of the card carriage and feed of the card to its left hand limit position( as viewed in Fig. 1). The escapement mechanism and carriage will now be explained.

The card carriage (Figs. 11, 13, and 14) comprises a bar 115 movable below the card bed 10 and to which a pair of spaced bars 116 are fastened. The ends of the bars 116 journal the rollers 117 which ride between upper and lower tracks 125 and 127 connected by bolts 126. The left hand limit of the carriage movement is determined by an adjustable screw 131 (Fig. 13) and a similar stop may be provided for limiting movement of the carriage to the right. Secured to the right end of the bar 115 is a bracket 118 carrying a card pusher 119. To the other end of the bar 115 is fastened a bracket 120 carrying a spring pressed card abutment 121. Bracket 120 is shaped, at its upper end, as a finger grip which the operator grasps to restore the card carriage to starting position at the right. The brackets 118 and 120 protrude through a longitudinal slot in the card bed 10 (see Fig. 1), and the card to be verified is placed between pusher 119 and abutment 121 to move together with the carriage bar 115.

Fastened to bar 115 through spacer bolts 122 are the rack 123, provided with teeth on opposite sides, and the escapement bar 124. The card carriage is advanced, from right to left, by a spring drive comprising a spring 132 tending to turn a pinion 133, rotatably supported by a pivot carried by a frame plate 134. The pinion 133 meshes with the teeth on one side of rack 123, and when the card carriage is released for advance, the pinion 133 turns counterclockwise (Fig. 14) to move the carriage towards the left.

The teeth on the opposite side of rack 123 mesh with a gear 135, which through pinions 137, drives a pinion 138 of a governor 139. The governor and the gears associated therewith are mounted on a frame plate 140.

The escapement means comprises a detent 141 pivoted on a pin 144 carried by a frame plate 143 (see also Figs. 15 and 16). An adjustable stop 145 is provided for engaging the tail of detent 141 when the latter is in its normal, counterclockwise position (Fig. 14), released from the teeth of escapement bar 124. An adjustable mounting piece 146 is pivotally carried by a pin 148 and held by a spring 149 in a counterclockwise position, engaged with an adjustable screw stop 150. Riveted in the mounting piece in the pin 147 upon which the pawl 142 is mounted with some clearance. The pawl 142 is normally held by a spring 156 with its tooth engaged with a tooth of the escapement bar 124, restraining advance of the card carriage. The pawl 142 is formed with an elongated slot through which passes, with clearance, a pin 151 of a lever 104 (see also Fig. 13) rotatably carried by pivot 147. A second pin 151' projects from lever 104 through a slot in the detent 141. Abutting one arm of lever 104 is a lever 153 connected by link 17 to armature lever 16 of the feed magnet 13 (see, particularly, Fig. 15). When the magnet is energized, its armature acts through link 17 to rock the lever 153 clockwise (Fig. 15), thereby rocking lever 104 counterclockwise (Fig. 14) against the resistance of spring means 155. Pin 151' thereupon rocks detent 141 into engagement with a tooth of escapement bar 124, and after this has happened, the pin 151 reaches the upper side of the slot of pawl 142 and lifts the pawl from a tooth of the escapement bar. As soon as pawl 142 is released from the escapement bar, its spring 156, draws it slightly to the right (Fig. 14), taking up the play of the pawl about pivot 147, and placing the nose of the pawl above the notch following the tooth previously engaged by the pawl. Meanwhile, detent 141 prevents advance of the card carriage. When magnet 13 is deenergized, lever 153 returns to normal position, permitting spring means 155 to restore lever 104. Pin 151 thereupon moves down and spring 156 rocks the nose of pawl 142 into the path of advance of the escapement tooth flanking the notch above which the pawl nose has been placed previously. After this occurs, pin 151' succeeds in completely releasing detent 141 from the escapement bar, whereupon spring 132 causes advance of the escapement bar the distance of one tooth before being arrested by the pawl 142. Each such step of advance of the card carriage equals the width of one card column and results in removing one column from verifying position and bringing the next column to verifying position below the column of contact balls 45 (Fig. 8) of the reading unit.

The depression of the release key and lever 96 results in a release of the card carriage for continuous movement to its left hand limit, bringing the card to its removal position. As described before, the operation of the release key rocks shaft 97 and its arm 98 clockwise (Fig. 8), yieldably drawing lever 99 in the same direction. The bent top of lever 99 thereupon strikes lever 108 (Figs. 13 and 15), rotatably carried by pivot 147 (see Figs. 13, 14, and 16), and rocks this lever counterclockwise (Fig. 14). The lever 108 has a transversely bent right end which, upon counterclockwise rocking of the lever, engages the overhanging free end of pawl 142 and lifts the nose of the pawl free of the escapement bar 124. Since the detent 141 remains disengaged from the escapement bar, the card carriage is released for continuous movement to the left hand limit. To retain lever 108 in counterclockwise, release position, even though the operator may allow the release key to be restored, until the carriage reaches the left hand limit, a shoulder of a pivoted latch 157 springs under the transversely bent right end of the lever and holds it in counterclockwise position. When the carriage nears its left hand limit, a pin 158 fixed to one end of the right hand spacer bolt 122 (Figs. 13 and 14) strikes the lower end of the latch 157 and rocks the latch towards the left to disengage it from the lever 108 which may then return clockwise to normal position.

The reading unit has a cover 170, the front wall of which has an index line 171 (Fig. 1) which indicates the conventional character at the foot of the column in verifying position.

A plug plate 159 (Fig. 7) is carried by housing 11 by means of which current from an outside supply may be led to the electrical parts of the machine.

Figure 17:
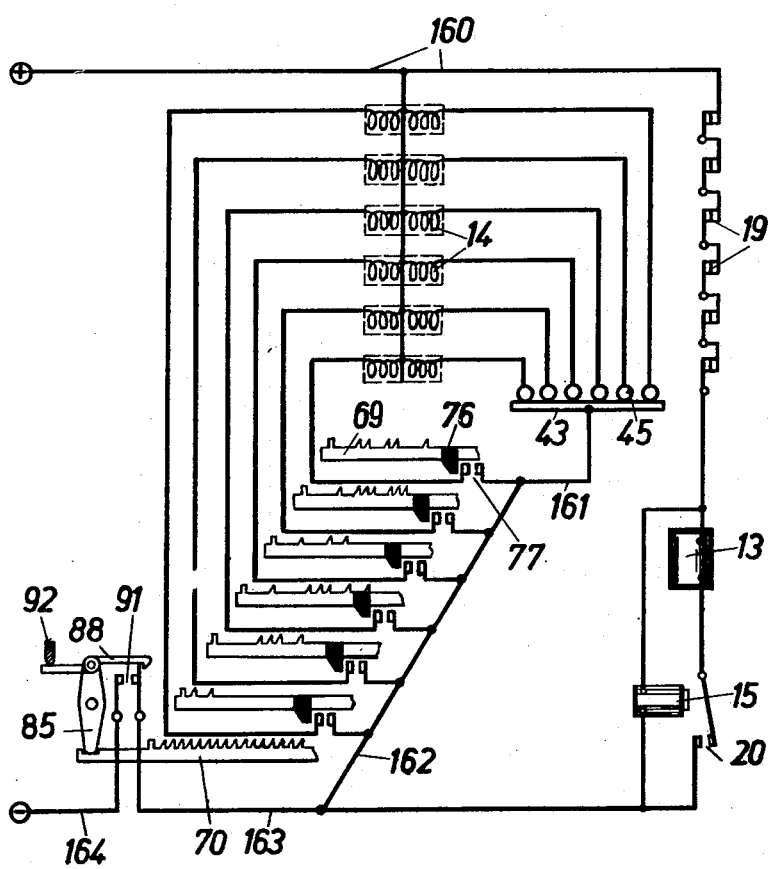
Fig. 17 is a circuit diagram of the electrical parts.

The operation will be briefly summarized with particular reference to the circuit diagram, Fig. 17. To verify a designation in a card column, the operator depresses the key lever 59 designated by the conventional character at the foot of the column (see Fig. 2) and indexed by index line 171 (see Fig. 1). Due to depression of the key lever, one or more of the selector slides 69 and, in addition, the common slide 70, are shifted to the right. The slides 69 close their related selector contacts 77 and the slide 70, shortly thereafter, causes closure of switch 91. Since at least one of the contacts 77 is closed upon depression of any character key (see Figs. 3 and 4), a circuit will be formed upon closure of these contacts 77 and the common switch 91 as follows:

*Left winding of comparing magnet.*—From side 164 of the current line, through switch 91, wire 163, wire 162, the closed contact 77, the connected left hand winding of a comparing magnet 14, and to the opposite side 160 of the current line.

Assuming that the column in verifying position has a perforation in one of its index positions, the contact ball 45, sensing this position, engages the contact plate 43 to form the following circuit:

*Right winding of comparing magnet.*—Line side 160, the right winding of a comparing magnet 14, the contact ball 45, the plate 43, wires 161, 162, and 163, switch 91, and to the opposite line side 164.

If the perforation sensed by the contact ball 45 and plate 43 is in the index position corresponding to the contacts 77 closed by depression of a character key, the two circuits traced above will form through the left and right windings of the same comparing magnet 14. Accordingly, the armature contacts 19 of this magnet will remain closed (see also Fig. 8). Similarly, if any other contacts 77 closed by depression of the character key match with a perforation sensed by a contact ball 45, the two windings of an associated magnet 14 will be simultaneously energized to neutralize each other and permit the armature contacts 19 to remain closed. Thus, if the operated character key 59 corresponds to the designation represented by perforations in the column being verified, the comparing magnets remain ineffective to open contacts 19.

The magnet 15, in series with contacts 19, is constructed to require a longer time to be energized effectively than the windings of comparing magnets 14 and does not close its armature contacts 20 until after the windings of the comparing magnets have had sufficient time to be energized singly or in pairs to determine whether contacts 19 are to be opened or to remain closed. If all the contacts 19 remain closed, the circuit through switch 91, magnet 15, and contacts 19 energizes the magnet to close its contacts 20, thereby establishing a circuit through feed magnet 13. The energization of the magnet acts through armature 16, link 17, and lever 153 (Fig. 15), to rock the lever 104 so as to release the pawl 142 from the escapement bar 124 and engage detent 141 with the bar (see also Figs. 13 and 14). The feed magnet 13, when energized, also acts through armature 16, link 18, and lever 92 (also see Fig. 6) to unhook lever 88 from plate lever 90 (see Fig. 7), causing switch 91 to reopen. As a result, the circuits through windings of magnet 14, and through magnets 15 and 13 are broken. Deenergization of magnet 13 permits lever 104 to return to normal and, thereby, to cause detent 141 to release the escapement bar while pawl 142 reengages the bar and stops the card carriage after a step of advance of the carriage. This removes the card column just verified from the verifying position, serving, thereby, as a manifestation that this card column has the correct codal designation of the conventional character written at the foot of the column. At the same time, the next column is brought to verifying position.

If a column contains an incorrect designation or no designation, then the operation of the indicated character key closes at least one pair of contacts 77 the corresponding index position of which has no perforation. Accordingly, the left hand winding of the comparing magnet 14 associated with the closed pair of contacts is energized, while the right hand winding, which would have been energized only if a matched perforation had been sensed by the reading unit, remains deenergized. The left hand winding, being energized alone, thereupon opens the pair of contacts 19 of the magnet 14 containing this winding. Similarly, if a perforation in a card column is sensed without the corresponding contacts 77 being closed, the right hand winding alone is energized to open the associated contacts 19. Thus, one or more of the contacts 19 are opened upon lack of agreement between the contacts 77 which have been closed by depression of a character key and the perforations in the card column at verifying position. Accordingly, magnet 15 is not effectively energized and its contacts 20 remain open, feed magnet 13 is not energized, and the card remains at rest as an indication that the correct codal representation is not in the column at verifying position.

When a card column is supposed to be blank, the space bar is operated. As explained before, this causes only common switch 91 to close and none of the selector contacts 77. Accordingly, none of the left windings of the comparing magnets 14 are energized. If the column is blank, none of the right windings are energized, and contacts 19 remain closed to cause energization of magnet 15 and feed magnet 13 in succession. If the column has been inadvertently perforated, one or more of the right windings will be energized and one or more of the contacts 19 will open to prevent energization of feed magnet 13.

No claim is made to the electrical verifying means and circuits per se, as these are shown in my German Patent No. 604,007. What I do claim as my invention is the construction of the sensing or reading unit which enables the written characters on the tandem deck card itself to be utilized for indicating the codal designations to be verified and the single reading or sensing unit shiftable to coact with any one of the record decks of the tandem deck card, as well as features relating thereto.

While there has been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims.

What is claimed is:

1. A machine to verify tandem deck record cards having a plurality of superpositioned record decks with similarly extending columns adapted to bear codal designations and having margins which may bear indications of the codal designations which are to be verified; comprising in combination, a designation reading unit adapted to read columns of a deck successively, means to move the card, while supported with the face bearing the marginal indications exposed, transversely of the direction in which the columns extend to place successive columns of a deck in coaction with the reading unit, means mounting the unit for movement in the direction in which the columns extend to enable the unit to be shifted from a position for coacting with one deck to another position for coacting with another deck of the same card, a keyboard having indication keys operable by an operator facing the exposed face of the card, said reading unit comprising sensing elements and a support therefor and sensing means to coact with the elements in sensing designations of any of the decks with which the unit is in coacting position, a support for the sensing means, said supports being fastened to each other at one end and being unconnected at their opposite ends to provide a card slot the sides of which straddle the opposite faces of the card, with one said support extending freely over the exposed face of the card and in any of the different selectable deck positions of the unit terminating short of the indication-bearing margin of the deck being verified so as to leave the indications which may be written in said margins visible to the keyboard operator to guide the operator in selecting the corresponding keys for operation, and comparing means jointly controlled by the selected keys and by the coaction of the sensing means and sensing elements for comparing the sensed designations with the indications corresponding to the selected keys.

2. The machine as defined in claim 6, the support for said sensing means having a dovetail-shaped guide portion and the means mounting the unit comprising a similarly shaped guideway slidably receiving the aforesaid guide portion to mount the reading unit slidably for shifting from one deck position to another, the indication-bearing margins of the record decks being their lower margins and the two aforesaid supports having their connection at the end remote from the lower margins and from the keyboard.

3. The machine as defined in claim 6, the analyzing elements comprising contact balls and the comparing means comprising stationary electrical instrumentalities, flexible wiring connecting the contact balls to the electrical instrumentalities, and means for preventing undue play and bending of said wiring comprising a holder and guide for the wiring mounted movably on the reading unit for movement relatively thereto during the shifting of the unit from one deck position to another.

4. A machine to verify tandem deck record cards having a plurality of superpositioned record decks, each having similarly extending columns bearing codal designations; comprising designation selecting means, an electrical designation reading unit, stationary electrical comparing devices jointly controlled by the selecting means and the reading unit to determine whether the designation selected by the selecting means agrees with the designation read by the unit, means mounting the unit for movement in the direction in which a record deck column extends to enable the unit to be shifted from a position for reading the designations of one deck to a position for reading the designations of another deck of the card, electrical connections between the unit and the comparing devices, and a holder for said connections swiveled to the shiftable unit and abutting a stationary part of the machine external to the unit whereby, upon shifting of the unit, the holder and connections rock to follow the shifting of the unit from one deck position to another without disturbing the relation of the connections to the stationary comparing devices.

MICHAEL MAUL.

CERTIFICATE OF CORRECTION.

Patent No. 2,282,072.

May 5, 1942.

MICHAEL MAUL.

It is hereby certified that error appears in the printed specification of the above numbered patent requiring correction as follows: Page 5, second column, line 68, claim 2, and page 6, first column, line 4, claim 3, for the depending claim "6" read --1--; and that the said Letters Patent should be read with this correction therein that the same may conform to the record of the case in the Patent Office.

Signed and sealed this 23rd day of June, A. D. 1942.

Henry Van Arsdale,
Acting Commissioner of Patents.

(Seal)